US006694014B1

(12) United States Patent
Knollman

(10) Patent No.: US 6,694,014 B1
(45) Date of Patent: Feb. 17, 2004

(54) CONSTANT IMPEDANCE DIGITAL LINE INTERFACE CIRCUIT

(76) Inventor: Dieter J. H. Knollman, 8213 Saulsbury Cir., Arvada, CO (US) 80003

( * ) Notice: Subject to any disclaimer, the term of this patent is extended or adjusted under 35 U.S.C. 154(b) by 0 days.

(21) Appl. No.: 09/363,775

(22) Filed: Jul. 29, 1999

(51) Int. Cl.[7] .......................... H04M 1/00; H04M 9/00; H04M 9/08
(52) U.S. Cl. ................. 379/399.01; 379/403; 379/404; 379/412
(58) Field of Search ............................ 379/399.01, 402, 379/403, 404, 405, 412, 413.02, 413.04

(56) References Cited

U.S. PATENT DOCUMENTS

| 4,320,498 A | * | 3/1982 | Justice |
| 4,550,226 A | * | 10/1985 | Teater |
| 5,511,118 A | * | 4/1996 | Gores et al. |
| 5,515,433 A | * | 5/1996 | Chen |

* cited by examiner

Primary Examiner—Duc Nguyen

(57) ABSTRACT

A digital line-interface circuit (100) presents a constant impedance to a telephone line (102) by emulating a short or a ground connection between the leads of the telephone line when the transmitter (104) is disabled. The receiver (106) includes a pair of differential op amps (U3, U4) connecting the receive line (122) to the outputs of the transmitter's drivers (U1A, U2A) across a pair of switches (K1, K2). The switches may be replaced by a receive enable (RE) signal line connected to enable (EN) inputs of the op amps. Negative inputs of the op amps are connected to outputs of different transmitter drivers, positive inputs of the op amps are connected to a bias voltage source (Vbias), and the output of each op amp is connected to the receive line and is also fed back by a bias resistor (R5, R6) to its negative input. When the transmitter drivers are disabled, the switches or RE signal line cause the op amps to be connected to the telephone line, where they simulate a short or a ground connection and thus present a low impedance to telephone line 102, just like enabled transmitter drivers, yet still allow the receive line to receive signals from the telephone line. The impedance of the line circuit is matched to the impedance of the telephone line by using only series resistors (R1 and R2) and not using shunt resistors across the leads of the telephone line, thereby eliminating the waste of power caused by shunt resistors.

11 Claims, 2 Drawing Sheets

US 6,694,014 B1

CONSTANT IMPEDANCE DIGITAL LINE INTERFACE CIRCUIT

TECHNICAL FIELD

This invention relates to transmission line-interface circuits, also known as line circuits or port circuits.

BACKGROUND OF THE INVENTION

A telephone line is terminated by a line-interface circuit at each end. A line-interface circuit both transmits and receives on the line. The transmitter of a conventional digital line-interface circuit has a high impedance when turned off and a low impedance when turned on. A network of series and shunt resistors is typically used to match the output impedance of the transmitter to the input impedance of the line. The network is typically designed to provide a matched impedance when the transmitter is turned off. This results in the line being driven with a source impedance that is less than the line impedance when the transmitter is turned on. This impedance mismatch results in undesirable signal reflections, as is well known. Moreover, the shunt resistors result in a waste of power. In most cases, about 50% of the transmitter's output power is absorbed by the shunt resistors.

SUMMARY OF THE INVENTION

This invention is directed to solving these and other problems and disadvantages of the prior art. Illustratively according to the invention, a line-interface circuit uses op amps to create a virtual short or ground at the output of the transmitter when the transmitter is turned off. This maintains a substantially constant impedance at the output of the transmitter irrespective of whether the transmitter of turned on or off. A network of series resistors is then used to match the impedance of the line. Since the output impedance of the transmitter is constant at all times, the impedance of the line—interface circuit is matched to the line impedance at all times by the resistor network. Moreover, since the resistor network does not use shunt resistors, the waste of power that is caused by the shunt resistors in conventional line interface circuits is eliminated. Furthermore, an illustrative implementation of the line-interface circuit uses fewer components than the implementation of a conventional line-interface circuit.

Generally according to the invention, a line-interface circuit comprises a transmitter and a receiver as follows. The transmitter presents a high impedance to a telephone line when the transmitter is not transmitting and a low impedance when it is transmitting, as is conventional. Significantly, however, the receiver is coupled to the transmitter and presents a high impedance to the telephone line when the transmitter is transmitting and a low impedance when the transmitter is not transmitting, so that an operating line-interface circuit presents a substantially constant impedance to a connected telephone line at all times. Illustratively, the receiver includes a switching arrangement that electrically couples the receiver to the telephone line when the transmitter is not transmitting and electrically uncouples the receiver from the telephone line when the transmitter is transmitting, and circuitry that connects to the telephone line through the switching arrangement and emulates shorting or grounding of the telephone line. Preferably, the switching arrangement comprises either a pair of transistors each coupling the receiver to a different lead of the telephone line, or enable inputs on the emulating circuitry and a signal line connected to the enable inputs that respectively enables and disables the emulating circuitry as the transmitter is disabled and enabled. Further preferably, the line-interface circuit comprises circuitry for coupling the transmitter and the receiver to the telephone line without employing shunt resistance across the telephone line.

These and other features and advantages of the present invention will become apparent from the following description of illustrative embodiments of the invention considered together with the drawing.

DETAILED DESCRIPTION

Figure 1:
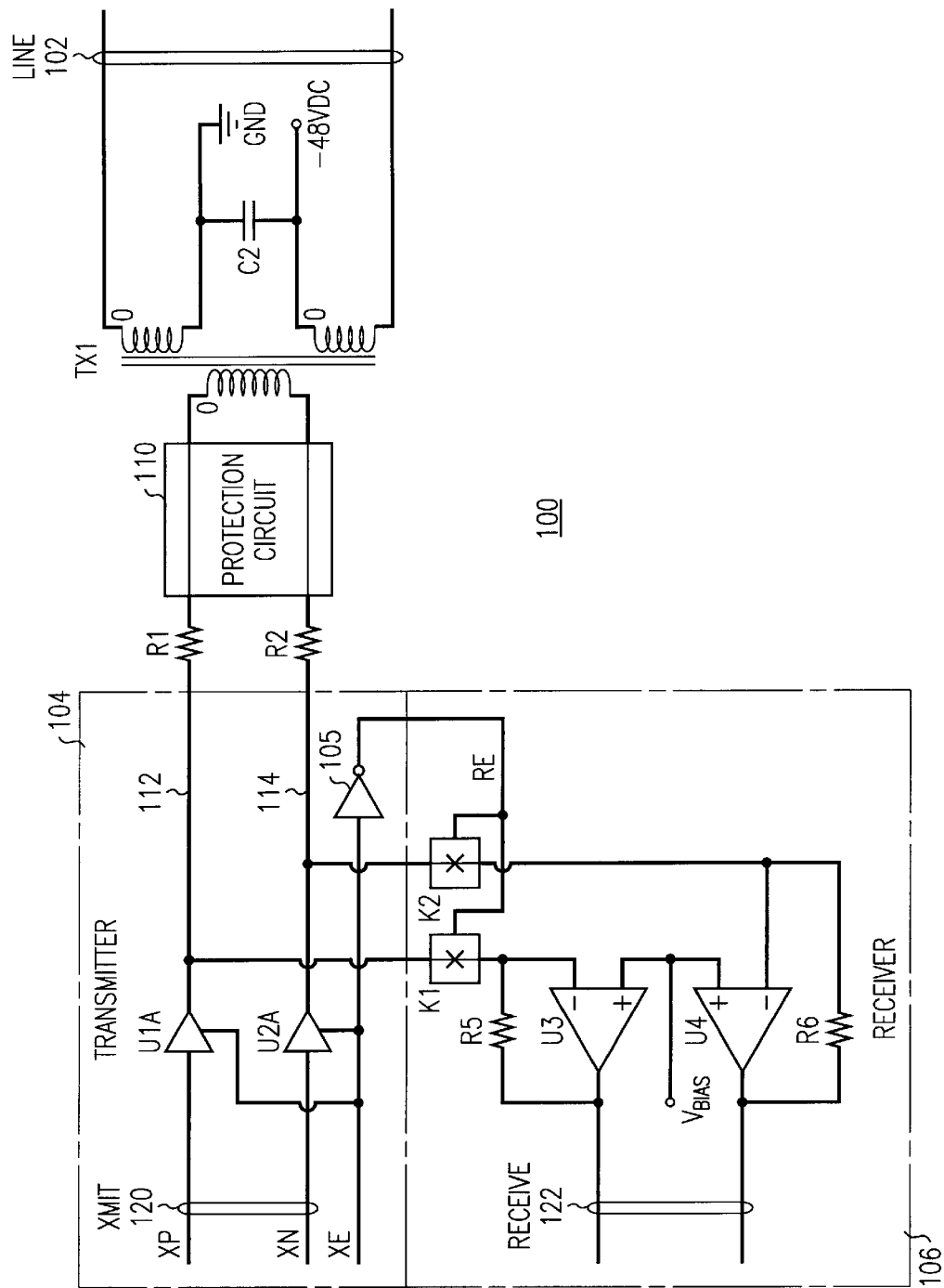
FIG. 1 is circuit diagram of a digital line-interface circuit that includes a first illustrative embodiment of the invention.

FIG. 1 shows a digital line-interface circuit 100 that includes a first illustrative embodiment of the invention. Circuit 100 is coupled to a digital telephone 102 line by a center-tapped transformer TX1. At one end, the secondary-windings of TX1 are connected to the two leads of line 102. At the other end, one of the secondary windings of TX1 is connected directly to ground GND and the other of the secondary windings is connected to ground GND by a capacitor C2. The transformer side of capacitor C2 is connected to a −48VDC source. The two ends of the primary winding of transformer TX1 are connected by leads 112 and 114 across a protection circuit 110 and series impedance-matching resistors R1 and R2 to a transmitter 104 and a receiver 106. Protection circuit 110 is illustratively a conventional diode network. Resistors R1 and R2 are illustratively 75Ω resistors.

In transmitter 104, leads 112 and 114 connect to the outputs of drivers U1A and U2A. The drivers are illustratively conventional tri-state buffers. Transmit positive Xp and transmit negative Xn signal leads 120 connect to inputs of drivers U1A and U2A, respectively. Drivers U1A and U2A are enabled and disabled by a transmit enable (XE) control signal lead. The XE signal enables drivers U1A and U2A to transmit positive and negative (+1 when Xp is active and −1 when Xn is active). Also, the XE signal disables drivers U1A and U2A when circuit 100 is receiving. As described so far, line-interface circuit 100 is conventional.

According to the invention, no impedance-matching shunt resistors are used across the primary winding of transformer TX1, i.e., across leads 112 and 114. Instead, a low impedance is maintained across leads 112 and 114 by U1A and U2A when XE is true since one is transmitting and the other is not transmitting resulting in low impedance across leads 112 and 114, or by receiver 106 when XE is false making a receive enable (RE) control signal true. RE is generated by inverter gate 105 and is the compliment of XE. By maintaining this low impedance, R1 and R2 determine the impedance seen by TX1. Note, circuit 100 transmits a +1 when Xp and XE are true, a −1 when Xn and XE are true, and a "0" when XE is false and RE is true via receiver 106 that places a low impedance across leads 112 and 114.

Consider now how receiver 106 places low impedance across leads 112 and 114 when RE is true. Receive leads 122 of receiver 106 are connected to leads 112 and 114 respectively across switches K1 and K2 and op amps U3 and U4. Switches K1 and K2 are transistors, and are controlled by RE. The RE signal closes switches K1 and K2 whenever transmitter drivers U1A and U2A are disabled and opens switches K1 and K2 when ever transmitter drivers U1A and U2A are enabled by the presence of XE. Leads 112 and 114 are connected respectively through switches K1 and K2 to negative (inverting) inputs of op amps U3 and U4. Op amps U3 and U4 have their positive inputs connected to a source of bias voltage, Vbias, and have their outputs fed back to their negative inputs respectively by feedback resistors R5 and R6. The outputs of op amps U3 and U4 are also connected to receive leads 122. Illustratively, if the operating supply voltage Vcc of circuit 100 is 5V, Vbias is 2.5V.

The operation of line-interface circuit 100 is as follows. When transmitter 104 is enabled (XE signal is active), switches K1 and K2 disconnect receiver 106 from line 102, and the very low output impedance of drivers U1A and U2A is compensated for and matched to the impedance of line 102 by resistors R1 and R2 and the action of transformer TX1. When transmitter 104 is disabled (XE signal is inactive) switches K1 and K2 connect receiver 106 to line 102, and the high output impedance of drivers U1A and U2A (when they are disabled) is compensated for by op amps U3 and U4 which, together with resistors R1 and R2 and the action of transformer TX1, match the impedance of line 102.

Contrary to conventional design, receiver 106 presents a very low impedance to leads 112 and 114. The feedback loops on the negative (inverting) inputs of op amps U3 and U4 maintain the differential voltage between the positive and negative inputs of each op amp U3 and U4 at zero, no matter what signals are present on leads 112 and 114. Hence, the effective impedance of op amps U3 and U4 is zero. This creates a short—a virtual ground connection—between leads 112 and 114. Consequently, the impedance presented by receiver 106 to line 102 is the impedance created by resistors R1 and R2—just as in the case of transmitter 104 when it is enabled by XE.

Even though op amps U3 and U4 create a virtual ground, they nevertheless continue to amplify the current of signals received from line 102 (which appears across feedback resistors R5 and R6) and present a low impedance to receive leads 122. Receiver 106 thus continues to be able to receive line 102 signals on leads 122. An added benefit, by the proper selection of the ratios of resistors R1/R5 and R2/R6, is that it is possible to achieve whatever attenuation or amplification is desired of signals received from line 102.

Figure 2:
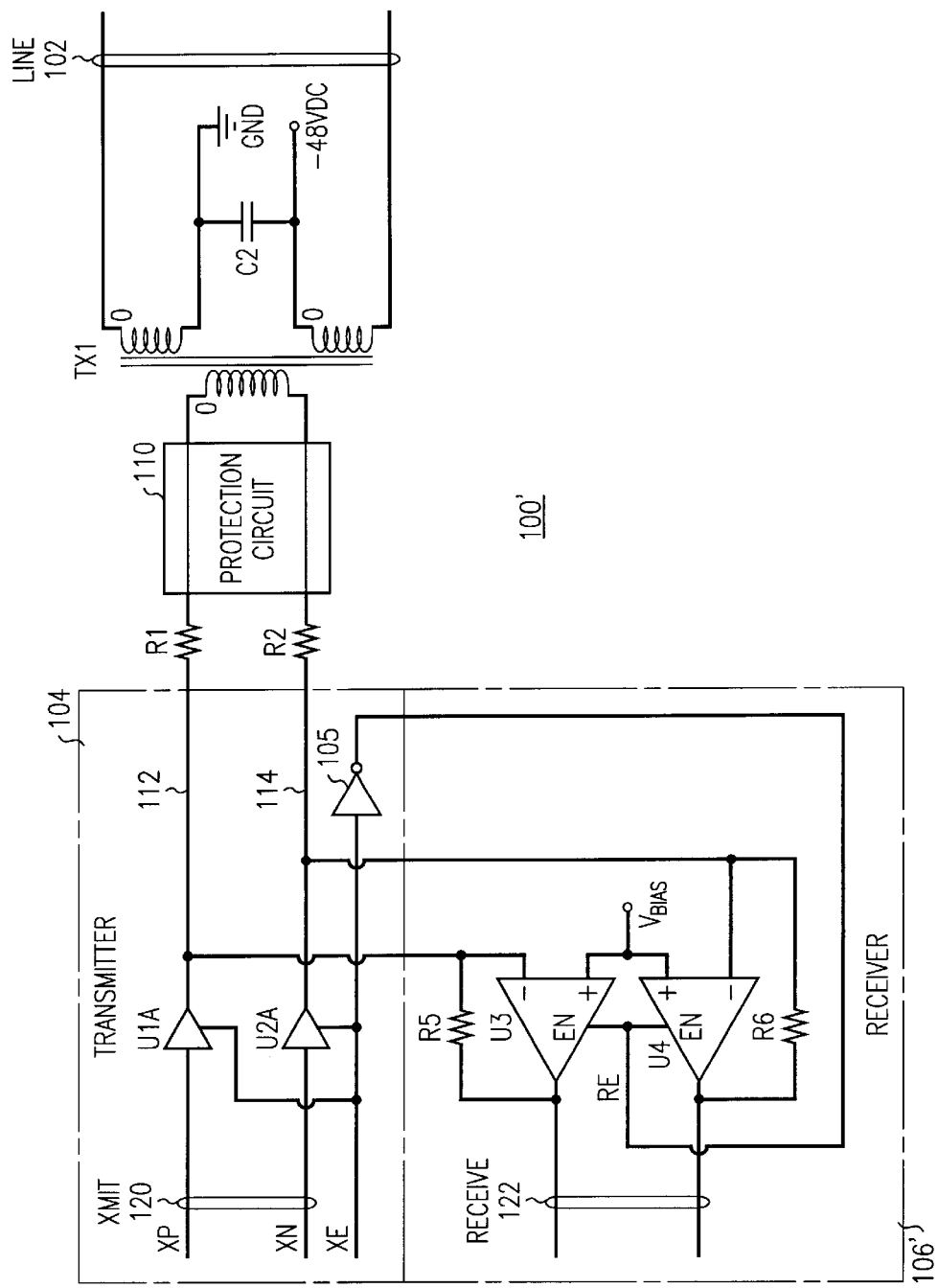
FIG. 2 is a circuit diagram of the digital line-interface circuit that includes a second illustrative embodiment of the invention.

FIG. 2 shows a digital line-interface circuit 100' that includes a second illustrative embodiment of the invention. Circuit 100' differs from circuit 100 only in that switches K1 and K2 are eliminated and are replaced by a connection of RE signal line to the enable EN inputs of op amps U3 and U4. When op amps U3 and U4 are disabled, they present a very high impedance to line 102—like drivers U1A and U2A when they are disabled—and therefore are effectively removed from line 102 as if they were switched out. Note, that leads 122 must terminate in a high impedance external to receiver 106. The advantage of this embodiment is that it eliminates the discrete components K1 and K2 and therefore is easier to implement in an integrated circuit.

As was mentioned above, the impedance seen by line 102 from receiver 106 is the same as the impedance seen from transmitter 104, and it is substantially the impedance provided by R1 and R2. The impedance is therefore constant during both transmit and receive operations. And since no shunt resistors are used, all power output of drivers U1A and U2A is delivered to line 102 and is not wasted.

Of course, various changes and modifications to the illustrative embodiment described above will be apparent to those skilled in the art. For example, one skilled in the art could readily envision how to eliminate TX1 and C2 and to eliminate the −48 VDC supply in FIGS. 1 and 2. Such changes and modifications can be made without departing from the spirit and the scope of the invention and without diminishing its attendant advantages. It is therefore intended that such changes and modifications be covered by the following claims except insofar as limited by the prior art.

What is claimed is:

1. A line-interface circuit for connection to a telephone line, comprising:

a transmitter presenting a high impedance to the telephone line when the transmitter is not transmitting and a low impedance when the transmitter is transmitting; and a receiver coupled to the transmitter, presenting a high impedance to the telephone line when the transmitter is transmitting and a low impedance when the transmitter is not transmitting;

so that in operating said line-interface circuit presents a substantially-constant impedance to said connected telephone line at all times.

2. The line-interface circuit of claim 1 wherein:

the receiver includes
a switching arrangement that electrically couples the receiver to the telephone line when the transmitter is not transmitting and electrically uncouples the receiver from the telephone line when the transmitter is transmitting.

3. The line-interface circuit of claim 2 wherein:

the receiver further includes
circuitry that connects to the telephone line through the switching arrangement and that emulates shorting or grounding of the telephone line.

4. The line interface circuit of claim 1 further comprising:

circuitry for coupling the transmitter and the receiver to the telephone line without employing shunt resistance across the telephone line.

5. The line-interface circuit of claim 1 wherein:

the transmitter comprises
a pair of drivers each coupled to a different lead of the telephone line and each presenting a high impedance to the telephone line when disabled and a low impedance when enabled; and
the receiver comprises
circuitry that emulates shorting of the leads of the telephone line to each other or to ground, and
a switching arrangement that electrically couples the emulating circuitry to the leads of the telephone line when the transmitter drivers are disabled and electrically uncouples the emulating circuitry from the leads of the telephone line when the transmitter drivers are enabled.

6. The line-interface circuit of claim 5 wherein:

the emulating circuitry comprises
a pair of differential amplifiers each having a first input coupled to a different lead of the telephone line, having a second input coupled to a source of bias voltage, and having an output coupled to a different receive lead and to the first input.

7. The line-interface circuit of claim 6 wherein:

each differential amplifier includes a resistor coupling the output to the first input.

8. The line-interface circuit of claim 7 wherein:

each differential amplifier comprises an op amp.

9. The line-interface circuit of claim 6 wherein:

the switching arrangement comprises an enable signal input on each differential amplifier, and an enable signal line connected to the enable signal inputs for enabling the differential amplifiers when the transmitter drivers are disabled and disabling the differential amplifiers when the transmitter drivers are enabled.

10. The line-interface circuit of claim 5 wherein:

the switching arrangement comprises a pair of transistors each coupled in an open-collector configuration to a different lead of the telephone line.

11. The line-interface circuit of claim 5 further comprising:

circuitry for coupling the transmitter and the receiver to the leads of the telephone line without employing shunt resistance across the leads of the telephone line.

* * * * *